(12) United States Patent
Nunome et al.

(10) Patent No.: US 7,771,873 B2
(45) Date of Patent: Aug. 10, 2010

(54) ALKALINE BATTERY

(75) Inventors: Jun Nunome, Kyoto (JP); Yuji Mototani, Kyoto (JP); Hidekazu Hiratsuka, Osaka (JP); Shigeru Hanaoka, Osaka (JP)

(73) Assignee: Panasonic Corporation, Osaka (JP)

( * ) Notice: Subject to any disclaimer, the term of this patent is extended or adjusted under 35 U.S.C. 154(b) by 924 days.

(21) Appl. No.: 11/440,160

(22) Filed: May 25, 2006

(65) Prior Publication Data

US 2007/0015054 A1 Jan. 18, 2007

(30) Foreign Application Priority Data

Jul. 12, 2005 (JP) ............................. 2005-202738

(51) Int. Cl.
*H01M 4/50* (2010.01)
(52) U.S. Cl. ..................................... 429/224
(58) Field of Classification Search .................. 429/224
See application file for complete search history.

(56) References Cited

U.S. PATENT DOCUMENTS

| 4,246,253 | A | 1/1981 | Hunter |
| 6,783,893 | B2 | 8/2004 | Bowden et al. |

2004/0058242 A1* 3/2004 Christian et al. ............ 429/224
2005/0227145 A1 10/2005 Iwamoto et al.

FOREIGN PATENT DOCUMENTS

KR 2005-099451 A 10/2005

OTHER PUBLICATIONS

"Physical Constants of Inorganic Compounds", in CRC Handbook of Chemistry and Physics, 89th Edition (Internet Version 2009), David R. Lide, ed., CRC Press/Taylor and Francis, Boca Raton, FL.*
ITE Letters on Batteries, New Technologies & Medicine, vol. 2, No. 3, pp. 341-348 (2001).
Korean Office Action issued in Korean Patent Application No. KR 10-2006-0063391, mailed Aug. 28, 2007.

* cited by examiner

*Primary Examiner*—Patrick Ryan
*Assistant Examiner*—Ashley Kwon
(74) *Attorney, Agent, or Firm*—McDermott Will & Emery LLP

(57) ABSTRACT

In an alkaline battery including a cathode mixture including gamma-manganese dioxide and lambda-manganese dioxide, an anode, and an alkaline electrolyte, the weight ratio of the lambda-manganese dioxide to the gamma-manganese dioxide is set to 0.5/100 to 4.5/100, and the average particle size of the lambda-manganese dioxide is set to 3 to 10 μm. An alkaline battery excellent in high-load discharge performance without decline in low-load discharge performance is provided.

2 Claims, 1 Drawing Sheet

ALKALINE BATTERY

FIELD OF THE INVENTION

The present invention relates to alkaline batteries comprising a cathode mixture including gamma-manganese dioxide and lambda-manganese dioxide, an anode, and an alkaline electrolyte.

BACKGROUND OF THE INVENTION

Recently, the range of uses for primary batteries such as alkaline-manganese batteries is widened. In addition to the conventional uses for low-load discharge, the uses for devices which require high-load discharge performance, such as for example digital still cameras, are increasing.

Therefore, for improvement in high-load discharge performance without deterioration in low-load discharge performance, the inventors of the present invention have been examining uses of lambda-manganese dioxide. There have been proposed, for example, methods to use lambda-manganese dioxide or to use a mixture of gamma-manganese dioxide (typically electrolytic manganese dioxide) and lambda-manganese dioxide in cathodes, as in U.S. Pat. No. 6,783,893 and US 2004/0058242. However, from the examination of the inventors of the present invention, clear effects could not be found in any of low-load discharge and high-load discharge. Additionally, although ITE Letters on Batteries, New Technologies & Medicine, Vol. 2, No. 3, pp.341-348 (2001) notes the method in which lambda-manganese dioxide is added to electrolytic manganese dioxide for use, no details can be found regarding examination on the particle size of lambda-manganese dioxide, and no remarkable improvement in discharge performance is shown.

The use of the conventional lambda-manganese dioxide or the mixture of lambda-manganese dioxide and gamma-manganese dioxide improves high-load discharge performance. However, there are problems in that because in a low-load discharge, lambda-manganese dioxide particles expand toward a termination of the discharge and the expansion involves an expansion of the cathode mixture as well, ion migration in the cathode mixture is inhibited and discharge polarization is increased, leading to remarkable deterioration in low-load discharge performance. Alkaline batteries are not always used for those devices involving a high-load discharge. Therefore, it is extremely unfavorable if the discharge-time decreases when the alkaline batteries are used for devices that conventionally involve low-load discharge.

BRIEF SUMMARY OF THE INVENTION

The present invention aims to solve the problems as described above.

An alkaline battery of the present invention comprises a cathode mixture, an anode, and an alkaline electrolyte. The cathode mixture includes gamma-manganese dioxide and lambda-manganese dioxide. A weight ratio of the lambda-manganese dioxide to the gamma-manganese dioxide is 0.5/100 to 4.5/100. An average particle size of the lambda-manganese dioxide is 3 to 10 µm.

According to the present invention, an alkaline battery in which high-load discharge performance is improved more than conventional alkaline batteries can be obtained without a decline in low-load discharge performance.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
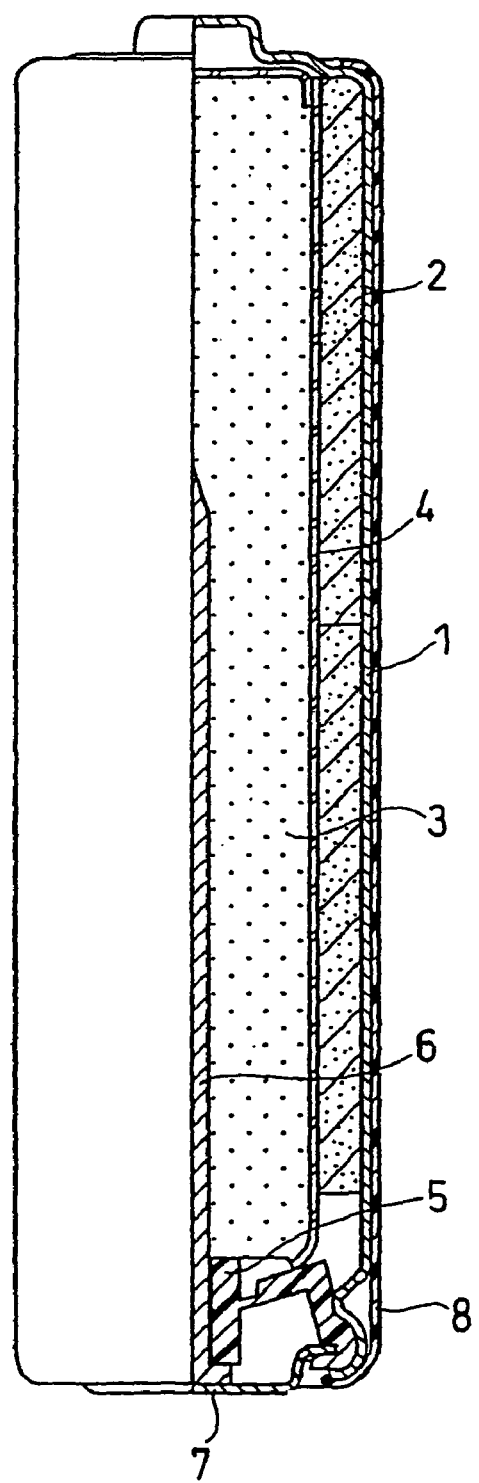
FIG. 1 is a front view of an alkaline battery in one embodiment of the present invention, partially cut away to reveal a cross sectional view.

The inventors of the present invention found that by mixing lambda-manganese dioxide with gamma-manganese dioxide for use in a cathode of alkaline-manganese batteries, electric resistance in the cathode can be decreased while in a relatively low degree of discharge depth to improve high-load discharge performance. They have also found that discharge capacity at the time of low-load discharge decreases when the weight ratio of the lambda-manganese dioxide to the gamma-manganese dioxide, and the average particle size of the lambda-manganese dioxide are not appropriate.

Thus, the inventors of the present invention carried out various examinations on the weight ratio of the lambda-manganese dioxide to the gamma-manganese dioxide to be used in the cathode, and the average particle size of the lambda-manganese dioxide, to increase a discharge capacity at the time of high-load discharge, while avoiding a decrease in discharge capacity at the time of low-load discharge.

As a result, it was found that the decrease in discharge capacity at the time of low-load discharge was minimized, and the discharge capacity at the time of high-load discharge increased when the ratio of the lambda-manganese dioxide to the gamma-manganese dioxide was in the range smaller than the conventional range, and the average particle size of the lambda-manganese dioxide was in the smaller range than the conventional range. It has been found that excellent results can be obtained when the weight ratio of the lambda-manganese dioxide relative to the gamma-manganese dioxide and the average particle size of the lambda-manganese dioxide both satisfy the such conditions.

Detailed examinations on changes caused by a discharge of the lambda-manganese dioxide revealed that the particles of the lambda-manganese dioxide expand by fine fractures or cracks into smaller pieces, when the discharge depth goes deeper. Such expansion of the particles involves the expansion of the whole cathode mixture. Thus, gaps in the cathode mixture increase to cause insufficient electrolyte, increase so-called concentration polarization, and decrease discharge capacity. When the ratio of the lambda-manganese dioxide to the gamma-manganese dioxide is small, the degree of capacity decrease becomes small as well. Also, when the particle size of the lambda-manganese dioxide is small, the expansion of the gamma-manganese dioxide, which has a relatively large particle size, can be absorbed by the small lambda-manganese dioxide particles in the gaps between the particles of the gamma-manganese dioxide. Thus, the expansion of the whole cathode mixture as described above becomes less, and the insufficient electrolyte is hardly caused. Additionally, due to the small particle of crystal, particle cracks from lattice distortion by a discharge are hardly caused.

From the above reasons, the excellent results can be obtained only when the weight ratio of the lambda-manganese dioxide to the gamma-manganese dioxide, and the average particle size of the lambda-manganese dioxide both satisfy the conditions of the present invention. That is, when the weight ratio of the lambda-manganese dioxide to the gamma-manganese dioxide in the cathode mixture is 0.5/100 to 4.5/100 and the average particle size of the lambda-manganese dioxide is 3 to 10 μm, excellent alkaline batteries with improved high-load discharge performance and without deterioration in discharge performance at the time of low-load discharge can be obtained.

When the weight ratio of the lambda-manganese dioxide to the gamma-manganese dioxide is below 0.5/100, high-load discharge performance becomes unsatisfactory, and when the weight ratio is greater than 4.5/100, discharge performance at the time of low-load discharge deteriorates. The weight ratio of the lambda-manganese dioxide to the gamma-manganese dioxide is most preferably 2.0/100 to 3.5/100, since the electric resistance in the cathode while discharging can be kept to a lower degree.

When the average particle size of the lambda-manganese dioxide is below 3 μm, a density of the cathode mixture is drastically reduced to deteriorate discharge performance under low-load. When the average particle size of the lambda-manganese dioxide is over 10 μm, discharge polarization is caused probably due to an expansion of the cathode mixture toward a termination of the discharge at low-load discharge, to decrease the discharge capacity at low-load discharge. The average particle size of the lambda-manganese dioxide is most preferably 7 to 9 μm, because the density of the cathode mixture becomes high, and the deterioration in low-load discharge performance barely occurs.

The average particle size of the manganese dioxides was determined by a laser diffraction/scattering particle size distribution analyzer (LA-920) manufactured by Horiba, Ltd.

The average particle size of the gamma-manganese dioxide is preferably 25 to 50 μm. This is because of a good balance in view of the cathode density and the reaction area of the gamma-manganese dioxide.

The mole ratio of Li to Mn in the lambda-manganese dioxide, i.e., Li/Mn, is preferably 0.03 to 0.20. When the mole ratio is within such a range, the lambda-manganese dioxide discharges with further higher efficiency.

For the alkaline electrolyte to be used in an alkaline battery of the present invention, an aqueous solution mainly composed of KOH and including ZnO can be mentioned. A KOH concentration of 34 to 40 wt %, and a ZnO concentration of 2 to 10 wt % are especially preferable. The alkaline electrolyte may include sodium hydroxide, lithium hydroxide, or calcium hydroxide.

For the anode, an alloy powder composed mainly of zinc is preferably used. Usually, such an alloy powder is mixed with the above-noted electrolyte and a gelling agent such as sodium polyacrylate to form a gelled anode for the usage. The anode active material may be a dischargeable, stable metal which shows a lower potential in an aqueous alkaline solution. Other metal, and an organic or inorganic additive may be mixed with such a metal powder for corrosion prevention and stability.

The gamma-manganese dioxide used in the present invention as a cathode active material is defined as a mixed crystal of a ramsdellite phase and a pyrolusite phase (a rutile structure). Electrolytic manganese dioxide prepared by electrolysis is an example of such gamma-manganese dioxide. Some natural manganese dioxide and chemically synthesized manganese dioxide also fall into the category of gamma-manganese dioxide. Among these, electrolytic manganese dioxide is preferable.

The average particle size of the gamma-manganese dioxide is preferably 25 to 50 μm, in view of increasing a density of the cathode. The cathode mixture may include other metal peroxide, metal oxide, and metal hydroxide such as nickel oxyhydroxide. Additionally, as a conductive agent for the cathode mixture, although an artificial graphite powder is preferably used in the range of 4 to 8 wt % in the cathode mixture, natural graphite, expanded graphite, or other carbon conductive agent may be included.

For the separator, although a nonwoven fabric including alkali-resistant rayon and pulp is used, a nonwoven fabric or a porous membrane of resin may be used as well.

Regarding a battery form, the effects can be obtained at most with a cylindrical, AA battery (LR6 type). For an outer jacket, a cylindrical case of nickel-plated steel is used. The size or shape of the battery is not limited to the above, and the case material may be resin.

For the lambda-manganese dioxide, preferably used is an oxide approximately represented by the general formula $Li_xMn_2O_4$ obtained by acid-treating lithium manganese oxide spinel approximately represented by the general formula $LiMn_2O_4$, such as the one described in U.S. Pat. No. 4,246,253. The lambda-manganese dioxide may be a spinel-like compound in which spinel and other manganese oxide structure are mixed.

EXAMPLE

Further concrete embodiments of the present invention are described in detail in the following.

(1) Preparation of Lambda-Manganese Dioxide

Electrolytic manganese dioxide (HHTF manufactured by TOSOH CORPORATION) crushed and arranged to give an average particle size of 8 μm, and lithium carbonate (Cica brand super-high grade, manufactured by Kanto Chemical Co., Inc) were mixed so that a mole ratio of Li to Mn, i.e., Li/Mn, becomes 0.55. The mixture was baked for 20 hours at 950° C. in the air by using an electric furnace, to obtain lithium manganese oxide spinel, a precursor of the lambda-manganese dioxide. The obtained lithium manganese oxide spinel was crushed roughly by using a mortar to loosen the agglomeration, and then sieved to give a size of 15 μm or less.

Then, 100 g of thus obtained lithium manganese oxide spinel powder was put into 200 ml of distilled water, and while stirring the mixture by using a screw at ambient temperature, 500 ml of 2N sulfuric acid was poured into the mixture slowly. The mixture was then stirred for 1 hour as it is, and by using a Buchner funnel and a filter paper, powder was obtained from the sulfuric acid reaction solution, and washed with distilled water. The obtained powder was dried at 100° C., crushed in a porcelain mortar to loosen the agglomeration, and then sieved to obtain lambda-manganese dioxide with an average particle size of 8.2 μm. The mole ratio of Li to Mn in the lambda-manganese dioxide was 0.12.

(2) Preparation of Cathode Mixture

Electrolytic manganese dioxide with an average particle size of 36 μm (NTA manufactured by Delta Australia pty Ltd.) was used as gamma-manganese dioxide. This manganese dioxide and the lambda-manganese dioxide obtained in the above (1) were mixed in ratios shown in Table 1. To 100 parts by weight of the mixture, 6.5 parts by weight of artificial graphite (SP20 manufactured by Nippon Graphite Industries, ltd.) was added and the whole mixture was mixed by a mixer to obtain a cathode mixture.

(3) Preparation of Cathode Pellet

The cathode mixture thus obtained was pressure-molded into a hollow cylindrical form by using a mold.

(4) Preparation of Gelled Anode

An electrolyte and sodium polyacrylate as a gelling agent were mixed with a weight ratio of 100:3 to obtain a gelled electrolyte. The gelled electrolyte and zinc alloy powder was mixed with a weight ratio of 1:2 to obtain a gelled anode. For the electrolyte, an aqueous solution including 37 wt % of potassium hydroxide and 3 wt % of zinc oxide was used.

(5) Assembly of Alkaline Battery

An alkaline battery of AA size having a structure shown in FIG. 1 was made as in below. Two cathode pellets obtained in the above were inserted in a battery case 1, and a cathode mixture 2 was re-molded by a compressing jig such that the mixture closely contact with the inner wall of the battery case 1. Then, in the center of the cathode mixture 2 disposed in the battery case 1, a bottomed, cylindrical separator 4 was disposed, and a predetermined amount of the same electrolyte as in the above was injected into the inside of the separator 4. After an elapse of a predetermined time, a gelled anode 3 obtained in the above was charged into the inside of the separator 4. For the separator 4, a nonwoven fabric made mainly of polyvinyl alcohol fiber and rayon fiber by a paper-making process was used.

Afterwards, an anode current collector 6 was placed in the center of the gelled anode 3. The anode current collector 6 was integrated beforehand with a gasket 5 and a bottom plate 7, which also serves as a negative terminal. Then, the opening end of the battery case 1 was crimped over the peripheral edge of the bottom plate 7 with a peripheral of the gasket 5 interposed therebetween, to seal the opening of the battery case 1. Finally, the external surface of the battery case 1 was covered by an outer jacket label 8, to obtain an alkaline battery (Battery 1).

Further, Batteries 2 to 19 were made in the same manner as Battery 1, except that the weight ratio of the lambda-manganese dioxide to the gamma-manganese dioxide, the average particle size of the lambda-manganese dioxide, the average particle size of the gamma-manganese dioxide, and the mole ratio of Li to Mn in the lambda-manganese dioxide were changed according to the values shown in Tables 1 to 4.

The mole ratio of Li to Mn in the lambda-manganese dioxide was adjusted by changing the amount of sulfuric acid to be added, as described in (1) in the above (Battery 1). An increase in the amount of sulfuric acid decreases the mole ratio of Li to Mn, and a decrease in the amount of sulfuric acid increases the mole ratio of Li to Mn.

On the other hand, as a comparative example, Comparative Battery 1 was made in the same manner as Battery 1, except that the cathode mixture comprises a mixture of gamma-manganese dioxide and artificial graphite, and does not include lambda-manganese dioxide.

Comparative Batteries 2 to 8 were also made in the same manner as Battery 1, except that the weight ratio of the lambda-manganese dioxide to the gamma-manganese dioxide, the average particle size of the lambda-manganese dioxide, the average particle size of the gamma-manganese dioxide, and the mole ratio of Li to Mn in the lambda-manganese dioxide were changed according to the values shown in Tables 1 to 4. The total amount of the lambda-manganese dioxide ($\lambda$-$MnO_2$) and the gamma-manganese dioxide ($\gamma$-$MnO_2$) in Batteries 1 to 19, and in Comparative Batteries 1 to 8 is the same.

(Evaluation of Battery)

Each of the above batteries was allowed to stand still afterwards in ambient temperature for 10 days, and evaluated as in below.

(1) High-Load Discharge Performance

A cycle of discharging for 2 seconds at 1500 mW and for 28 seconds at 500 mW was repeated for 10 cycles (total of 5 minutes), and the batteries were allowed to stand for 55 minutes (total of 1 hour). Such a process was repeated, and the discharge-time for the battery to reach a voltage of 1.05 V was determined.

(2) Low-Load Discharge Performance

The discharge-time was determined for the batteries to reach a voltage of 0.9 V at a current of 100 mA.

The evaluations above were carried out at a temperature of 20° C. The discharge-time of each battery is shown as an index, setting the discharge-time of Comparative Battery 1 as 100.

TABLE 1

|  | $\lambda$-$MnO_2$/ $\gamma$-$MnO_2$ | Average particle size of $\lambda$-$MnO_2$ (μm) | Average particle size of $\gamma$-$MnO_2$ (μm) | Li/Mn ratio in $\lambda$-$MnO_2$ | High-load discharge performance (index) | Low-load discharge performance (index) |
| --- | --- | --- | --- | --- | --- | --- |
| Battery 1 | 3.0/100 | 8.2 | 36 | 0.12 | 140 | 99.8 |
| Battery 2 | 0.5/100 | 8.2 | 36 | 0.12 | 124 | 99.7 |
| Battery 3 | 2.0/100 | 8.2 | 36 | 0.12 | 135 | 99.8 |
| Battery 4 | 3.5/100 | 8.2 | 36 | 0.12 | 138 | 99.3 |
| Battery 5 | 4.5/100 | 8.2 | 36 | 0.12 | 133 | 99.2 |
| Battery 6 | 0.5/100 | 3.0 | 36 | 0.12 | 111 | 100.1 |
| Battery 7 | 4.5/100 | 10 | 36 | 0.12 | 131 | 99.1 |
| Comp. Battery 1 | 0.0/100 | — | 36 | 0.12 | 100 | 100.0 |
| Comp. Battery 2 | 0.4/100 | 8.2 | 36 | 0.12 | 103 | 99.9 |
| Comp. Battery 3 | 5.0/100 | 8.2 | 36 | 0.12 | 131 | 86.8 |
| Comp. Battery 4 | 10.0/100 | 8.2 | 36 | 0.12 | 118 | 79.9 |
| Comp. Battery 5 | 10.0/100 | 12 | 36 | 0.12 | 101 | 77.5 |

TABLE 2

|  | λ-MnO$_2$/ γ-MnO$_2$ | Average particle size of λ-MnO$_2$ (μm) | Average particle size of γ-MnO$_2$ (μm) | Li/Mn ratio in λ-MnO$_2$ | High-load discharge performance (index) | Low-load discharge performance (index) |
|---|---|---|---|---|---|---|
| Battery 1 | 3.0/100 | 8.2 | 36 | 0.12 | 140 | 99.8 |
| Battery 8 | 3.0/100 | 3.0 | 36 | 0.12 | 131 | 99.2 |
| Battery 9 | 3.0/100 | 7.0 | 36 | 0.12 | 138 | 99.4 |
| Battery 10 | 3.0/100 | 9.0 | 36 | 0.12 | 136 | 99.3 |
| Battery 11 | 3.0/100 | 10 | 36 | 0.12 | 130 | 99.3 |
| Comp. Battery 6 | 3.0/100 | 2.6 | 36 | 0.12 | 137 | 94.4 |
| Comp. Battery 7 | 3.0/100 | 12 | 36 | 0.12 | 136 | 88.6 |
| Comp. Battery 8 | 3.0/100 | 24 | 36 | 0.12 | 121 | 82.9 |

TABLE 3

|  | λ-MnO$_2$/ γ-MnO$_2$ | Average particle size of λ-MnO$_2$ (μm) | Average particle size of γ-MnO$_2$ (μm) | Li/Mn ratio in λ-MnO$_2$ | High-load discharge performance (index) | Low-load discharge performance (index) |
|---|---|---|---|---|---|---|
| Battery 1 | 3.0/100 | 8.2 | 36 | 0.12 | 140 | 99.8 |
| Battery 12 | 3.0/100 | 8.2 | 23 | 0.12 | 141 | 99 |
| Battery 13 | 3.0/100 | 8.2 | 25 | 0.12 | 140 | 99.5 |
| Battery 14 | 3.0/100 | 8.2 | 50 | 0.12 | 125 | 99.7 |
| Battery 15 | 3.0/100 | 8.2 | 55 | 0.12 | 121 | 100.0 |

TABLE 4

|  | λ-MnO$_2$/ γ-MnO$_2$ | Average particle size of λ-MnO$_2$ (μm) | Average particle size of γ-MnO$_2$ (μm) | Li/Mn ratio in λ-MnO$_2$ | High-load discharge performance (index) | Low-load discharge performance (index) |
|---|---|---|---|---|---|---|
| Battery 1 | 3.0/100 | 8.2 | 36 | 0.12 | 140 | 99.8 |
| Battery 16 | 3.0/100 | 8.2 | 36 | 0.02 | 133 | 99.7 |
| Battery 17 | 3.0/100 | 8.2 | 36 | 0.03 | 140 | 99.7 |
| Battery 18 | 3.0/100 | 8.2 | 36 | 0.20 | 138 | 99.6 |
| Battery 19 | 3.0/100 | 8.2 | 36 | 0.22 | 133 | 99.1 |

The above results confirmed the following.

In any of the batteries in Examples, high-load discharge performance improved compared with conventional alkaline batteries not using lambda-manganese dioxide in cathodes. The index of high-load discharge performance is more than 110, clearly showing the effects. Additionally, the batteries in all Examples showed low-load discharge performance of 99 or more, showing almost no capacity reduction.

Comparative Battery 2 showed little improvement in high-load discharge performance, due to an extremely small ratio of the lambda-manganese dioxide to the gamma-manganese dioxide. Comparative Battery 3 showed notable reduction in low-load discharge capacity, because of an excessively large ratio of the lambda-manganese dioxide to the gamma-manganese dioxide. Comparative Battery 4 showed notable reduction in low-load discharge performance, due to a large ratio of the lambda-manganese dioxide to the gamma-manganese dioxide, i.e., 10/100. This is probably because when the cathode mixture expanded toward the termination of discharge, due to the excessive amount of the lambda-manganese dioxide, electrolyte migration was inhibited. Also, a relatively small improvement in high-load discharge performance suggests that the above detrimental effects of the cathode mixture expansion already appear while in the high-load discharge, where cathode utilization rate is relatively low. Further, Comparative Battery 5 showed the above detrimental effects further explicitly, due to the fact that the lambda-manganese dioxide with a large average particle size was used, and the ratio of the lambda-manganese dioxide to the gamma-manganese dioxide was large.

On the other hand, Comparative Battery 6 showed a decline in the density of cathode mixture and in low-load discharge performance, due to an excessively small average particle size of the lambda-manganese dioxide. Comparative Battery 7 showed a decline in low-load discharge performance, due to an excessively large average particle size of the lambda-manganese dioxide which possibly caused the expansion of the cathode mixture toward the termination of the discharge. Comparative Battery 8 showed such tendency to a further extent, due to a further large average particle size of the lambda-manganese dioxide.

As is clear from the above, according to the present invention, deterioration of discharge performance due to the cathode mixture expansion toward a termination of discharge in low-load discharge is reduced, and better discharge performance can be obtained in high-load discharge.

As described above, an alkaline battery of the present invention is excellent in high-load discharge performance without deterioration in low-load discharge performance, making it suitable for a wide range of devices, i.e., electronic devices such as digital cameras, and also the devices which have been using alkaline batteries.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An alkaline battery comprising a cathode mixture including gamma-manganese dioxide and lambda-manganese dioxide, an anode, and an alkaline electrolyte,
   wherein a weight ratio of said lambda-manganese dioxide to said gamma-manganese dioxide is 2.0/100 or more and 3.5/100 or less,
   wherein, an average particle diameter of said lambda-manganese dioxide is 7 μm or more and 9 μm or less, and
   wherein an average particle diameter of said gamma-manganese dioxide is 25 μm or more and 50 μm or less.

2. The alkaline battery in accordance with claim 1, wherein said lambda-manganese dioxide comprises Li and wherein a mole ratio of said Li to Mn in said lambda-manganese dioxide is 0.03 or more and 0.20 or less.

* * * * *